United States Patent
Nishizawa

(10) Patent No.: US 9,113,098 B2
(45) Date of Patent: Aug. 18, 2015

(54) IMAGE PICKUP APPARATUS AND CONTROL METHOD THEREOF, IMAGE PICKUP SYSTEM, AND NON-TRANSITORY COMPUTER-READABLE STORAGE MEDIUM

(71) Applicant: CANON KABUSHIKI KAISHA, Tokyo (JP)

(72) Inventor: Hideta Nishizawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/219,267

(22) Filed: Mar. 19, 2014

(65) Prior Publication Data
US 2014/0293098 A1 Oct. 2, 2014

(30) Foreign Application Priority Data
Mar. 26, 2013 (JP) ................................. 2013-063299

(51) Int. Cl.
*H04N 5/361* (2011.01)
*H04N 5/345* (2011.01)

(52) U.S. Cl.
CPC ............. *H04N 5/361* (2013.01); *H04N 5/3454* (2013.01)

(58) Field of Classification Search
CPC ............................ H04N 5/361; H04N 5/3454
USPC ......................................................... 348/341
See application file for complete search history.

(56) References Cited

U.S. PATENT DOCUMENTS

| | | | |
|---|---|---|---|
| 6,084,634 A | 7/2000 | Inagaki et al. | |
| 6,982,705 B2 * | 1/2006 | Kunimi et al. | 345/204 |
| 7,606,472 B2 | 10/2009 | Nishizawa | |
| 7,746,399 B2 | 6/2010 | Itoh et al. | |
| 8,405,744 B2 * | 3/2013 | Ukita | 348/241 |
| 2005/0018064 A1 | 1/2005 | Itoh et al. | |
| 2007/0223069 A1 | 9/2007 | Ota | |
| 2008/0158397 A1* | 7/2008 | Hayakawa | 348/274 |
| 2008/0218609 A1* | 9/2008 | Blanquart et al. | 348/243 |

FOREIGN PATENT DOCUMENTS

| | | |
|---|---|---|
| JP | 09-135388 | 5/1997 |
| JP | 2004-328671 | 11/2004 |
| JP | 2007-259135 A | 10/2007 |

OTHER PUBLICATIONS

Japanese Office Action issued in counterpart Japanese Patent Application No. 2013-063299, Jun. 23, 2015.

* cited by examiner

*Primary Examiner* — James Hannett
(74) *Attorney, Agent, or Firm* — Fitzpatrick, Cella, Harper & Scinto

(57) ABSTRACT

An image pickup apparatus includes an image pickup unit having an optical black area, a control unit which reads a pixel from a selected area in a part of the image pickup unit, and a dark offset correction unit which sets a correction value acquisition area in the optical black area included in the selected areas. When the control unit performs a reading from a first selected area and a reading from a second selected area which at least partially overlaps with the first selected area, the dark offset correction unit sets a first correction value acquisition area set for the optical black area included in the first selected area and a second correction value acquisition area set for the optical black area included in the second selected area such that the first and second correction value acquisition areas at least partially overlap with each other.

9 Claims, 10 Drawing Sheets

FIG. 6A
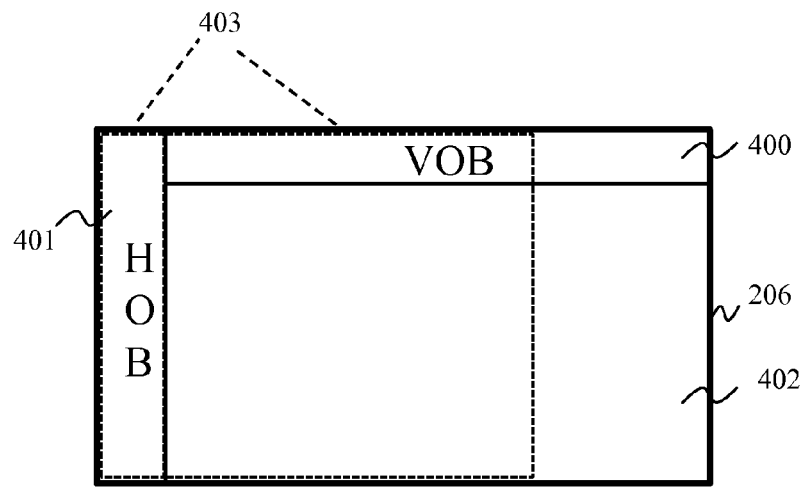
FIG. 6B
FIG. 6C
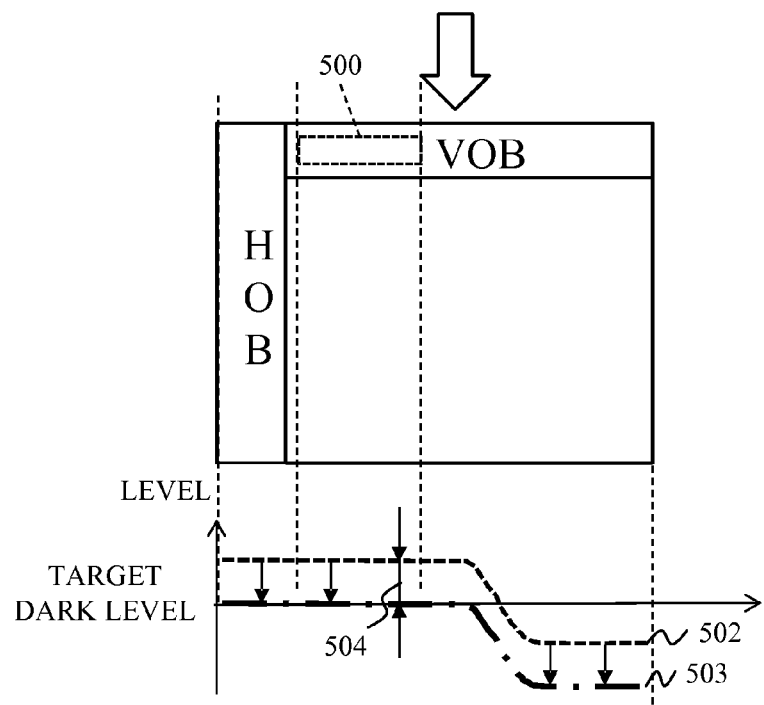

CORRECTION VALUE OF ALL ROWS

IMAGE PICKUP APPARATUS AND CONTROL METHOD THEREOF, IMAGE PICKUP SYSTEM, AND NON-TRANSITORY COMPUTER-READABLE STORAGE MEDIUM

BACKGROUND OF THE INVENTION

1. Field of the Invention

The present invention relates to an image pickup apparatus.

2. Description of the Related Art

Japanese Patent Laid-Open No. ("JP") 2007-259135 discloses a configuration in which a read-out method is set to a dual-read-out method and a black level of each of left and right areas is corrected by using light shielding levels of the left and right areas when a signal level of an optical black area (an OB level) is less than a predetermined value in a black level correction. JP 2007-259135 also discloses a configuration in which the read-out method is set to a single-read-out method and a black level of the entire area is corrected by using alight shielding level of the left area when the OB level is not less than the predetermined value.

However, when the OB level is more than or equal to a predetermined value, the configuration disclosed in JP 2007-259135 cannot consistently perform the dual-read-out method because it is required to switch a current read-out method to the single-read-out method even if the dual-read-out method is desired to be performed. Moreover, the configuration may fail to perform an accurate black level correction corresponding to the entire screen when the OB level is more than or equal to the predetermined value.

SUMMARY OF THE INVENTION

The present invention acquires an accurate dark offset correction value corresponding to an entire screen in a mode in which a part of an image on the entire screen is cut out.

An image pickup apparatus as one aspect of the present invention includes an image pickup unit having an optical black area, a control unit configured to read a pixel from a selected area in a part of the image pickup unit, and a dark offset correction unit configured to set a correction value acquisition area in the optical black area included in the selected areas. When the control unit performs a reading from a first selected area and a reading from a second selected area which at least partially overlaps the first selected area, the dark offset correction unit sets a first correction value acquisition area set for the optical black area included in the first selected area and a second correction value acquisition area set for the optical black area included in the second selected area such that the first correction value acquisition area and the second correction value acquisition area at least partially overlap with each other.

Further features and aspects of the present invention will become apparent from the following description of exemplary embodiments with reference to the attached drawings.

BRIEF DESCRIPTION OF THE DRAWINGS

FIGS. 6A to 6C are explanatory diagrams of a function of a dark offset in the present invention.

DESCRIPTION OF THE EMBODIMENTS

Figure 2:
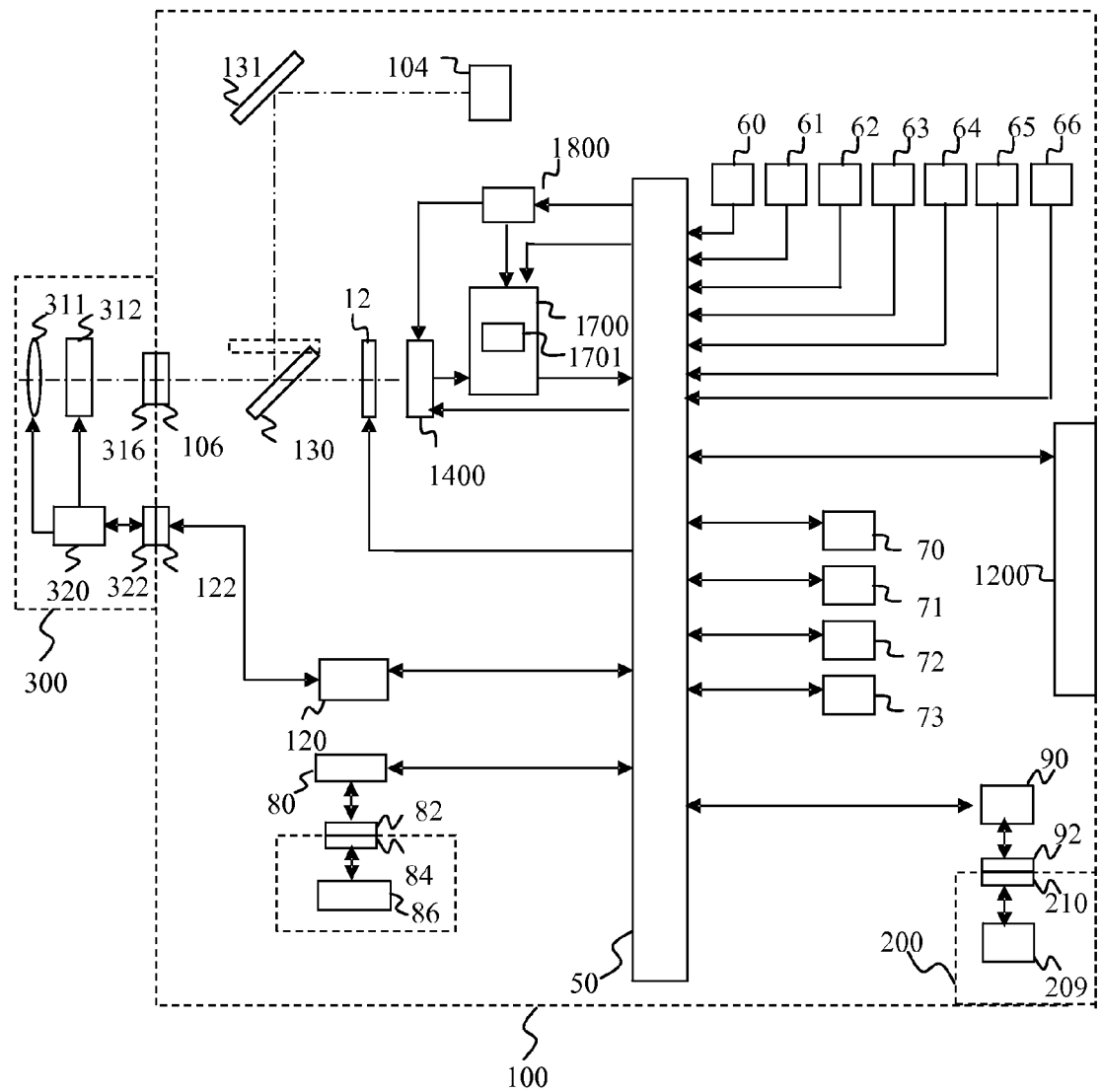
FIG. 2 is a block diagram of an image pickup apparatus in the present invention.

Exemplary embodiments of the present invention will be described below with reference to the accompanied drawings. FIG. 2 is a block diagram of an image pickup apparatus according to each embodiment of the present invention.

Reference numeral 100 denotes an image pickup apparatus (body), reference numeral 200 denotes a recording medium such as a memory card and a hard disk which is to be connected to the image pickup apparatus 100, and reference numeral 300 denotes a lens unit (an image pickup lens) removably mounted on the image pickup apparatus 100. First, the details of the image pickup apparatus 100 and the recording medium 200 will be described. While, in this embodiment, a lens-interchangeable image pickup apparatus (an image pickup system or a camera system) will be described, the present invention is also applicable to a lens-equipped image pickup apparatus.

Reference numeral 12 denotes a shutter configured to control an accumulation amount of an image pickup element, and reference numeral 1400 denotes the image pickup element (an image pickup unit) configured to convert an optical image to an electrical signal (an image signal). The image pickup element 1400 of this embodiment is a photoelectric conversion element (photodiodes) constituted by a CMOS sensor or a CCD sensor. In this embodiment, the image pickup element 1400 is constituted by a CMOS sensor. Since the CMOS sensor can be manufactured by using a general-purpose semiconductor manufacturing apparatus, the production cost of an image pickup element can be reduced. The image pickup element 1400 of this embodiment includes two photodiodes PDs for each pixel so as to perform an imaging-plane phase difference AF. Alight beam passing through an entire region of an exit pupil EP in an image pickup optical system TL of the lens unit 300 is divided by a micro lens ML and then the divided light beams are imaged on the two photodiodes PDs, and thus the image pickup element 1400 is capable of extracting two signals of an image pickup signal and an AF signal (a focus detection signal).

Reference numerals 130 and 131 denote mirrors. Reference numeral 104 denotes an optical finder, which images incident light passing through the lens unit 300 so that a user can check a composition of a still image to be shot when the mirror 130 is positioned on an optical axis.

Reference numeral 1700 denotes an analog front end (hereinafter, referred to also as an "AFE") which includes an A/D converter configured to convert an analog signal output from the image pickup element 1400 to a digital signal. Reference numeral 1701 denotes a dark offset correction circuit (a dark offset correction unit) which performs a dark offset correction based on data of an optical black portion (an OB part) described below. The dark offset correction circuit 1701 is provided inside the AFE 1700. Reference numeral 1800 denotes a timing generator (hereinafter, referred to also as a "TG") which supplies a clock signal and a control signal to the image pickup element 1400 and the A/D converter.

Reference numeral 1200 denotes a liquid crystal display monitor (a display unit), which is capable of displaying a live-view image or a shot still image.

Reference numeral 50 denotes a system control circuit (a control unit; hereinafter, referred to also as a "CPU") which controls the entire operation including image processing of the image pickup apparatus 100.

Reference numeral 60 denotes a mode dial switch, which is capable of selectively switching each of function shooting modes such as an auto shooting mode, a programmed shooting mode, a shutter speed priority mode, and an aperture priority shooting mode, and a bulb shooting mode.

Reference numeral 61 denotes a shutter switch. The shutter switch 61 has a two-stage structure, in which pressing shallowly up to the first stage is called "half press" and pressing deeply up to the second stage is called "full press". The half press of the shutter switch 61 allows performing auto focus, and setting a shutter speed and an aperture value based on an auto exposure mechanism during a pre-shooting state. The full press of the shutter switch 61 allows the operation of the shutter 12 to perform a shooting operation.

Reference numeral 62 denotes a live-view start/stop switch, and a sequential movie recording operation is performed in response to an instruction by the live-view start/stop switch 62 to start recording.

Reference numeral 63 denotes a live-view full screen/enlarged (partial cutting out) switch, and a live-view display between full screen and enlarged modes can be switched by pressing the switch 63.

Reference numeral 64 denotes an ISO sensitivity setting switch, which is capable of setting a sensitivity of the image pickup apparatus 100 to a light intensity.

Reference numeral 65 denotes a dial switch, which sets a period (a time) of charge accumulation by the image pickup element 1400 after the shutter 12 is opened. During shooting a movie, the dial switch 65 sets a time from reset start to read start of each line.

Reference numeral 66 denotes a power supply switch, which performs on/off switching of the image pickup apparatus 100. The power supply switch 66 are also capable of performing on/off switching of various auxiliary components such as the lens unit 300, an external strobe (not illustrated in the drawing), and the recording medium 200 which are connected to the image pickup apparatus 100.

Reference numeral 70 denotes a volatile memory (hereinafter, referred to also as a "RAM") which temporarily stores image data digitalized by the AFE 1700 and image data processed by an image processor described later. The volatile memory 70 also functions as a work memory of the CPU 50.

Reference numeral 71 denotes a nonvolatile memory (a ROM), which stores a program to cause the CPU 50 to operate.

Reference numeral 72 denotes the image processor which performs correction, compression, and other processing of a still image.

Reference numeral 73 denotes a dark horizontal shading correction unit.

Reference numeral 80 denotes a power supply controller, which is constituted by a battery detection circuit, a DC-DC converter, a switch circuit which switches a block to be energized, and the like. Furthermore the power supply controller 80 detects whether a battery is attached or not, and a type and a remaining power of the battery, and controls the DC-DC converter based on detection results and an instruction from the system controller 50 to supply a required voltage to each component including the recording medium 200 for a required period of time.

Reference numerals 82 and 84 denote connectors, and reference numeral 86 denotes a power supply unit constituted by a primary battery such as an alkaline battery or a lithium battery, a secondary battery such as a lithium ion battery, an AC adaptor, or the like.

Reference numeral 90 denotes an interface with the recording medium 200, and reference numeral 92 denotes a connector which connects the interface 90 and the recording medium 200.

Reference numeral 120 denotes an interface provided to enable the system control circuit 50 to communicate with the lens unit 300 by an electrical signal, and reference numeral 122 denotes a connector which connects the interface 120 and the lens unit 300.

The recording medium 200 includes a recording unit 209 constituted by a semiconductor memory, a magnetic disk, or the like, and an interface 210 with the image pickup apparatus 100.

Subsequently, the details of the lens unit 300 will be described.

Reference numeral 311 denotes an image pickup lens and reference numeral 312 denotes a diaphragm (an aperture stop). In this embodiment, the image pickup lens 311 and the diaphragm 312 constitute an image pickup optical system. Reference numerals 316 and 106 denote lens mounts configured to connect the lens unit 300 to the image pickup apparatus 100. Reference numeral 320 is a lens controller, and reference numeral 322 denotes a connector configured to electrically connect the lens unit 300 to the image pickup apparatus 100. The lens controller 320 receives a signal from the image pickup apparatus 100 via the connectors 322 and 122. The lens controller 320 changes a position of the image pickup lens 311 on an optical axis based on the signal to control focusing and zooming. Similarly, the lens controller 320 receives a signal from the image pickup apparatus 100 to control the size of the diaphragm 312. In addition, the lens controller 320 sends lens information of the lens unit 300 to the image pickup apparatus 100 (the CPU 50) via the connectors 322 and 122.

Figure 3:
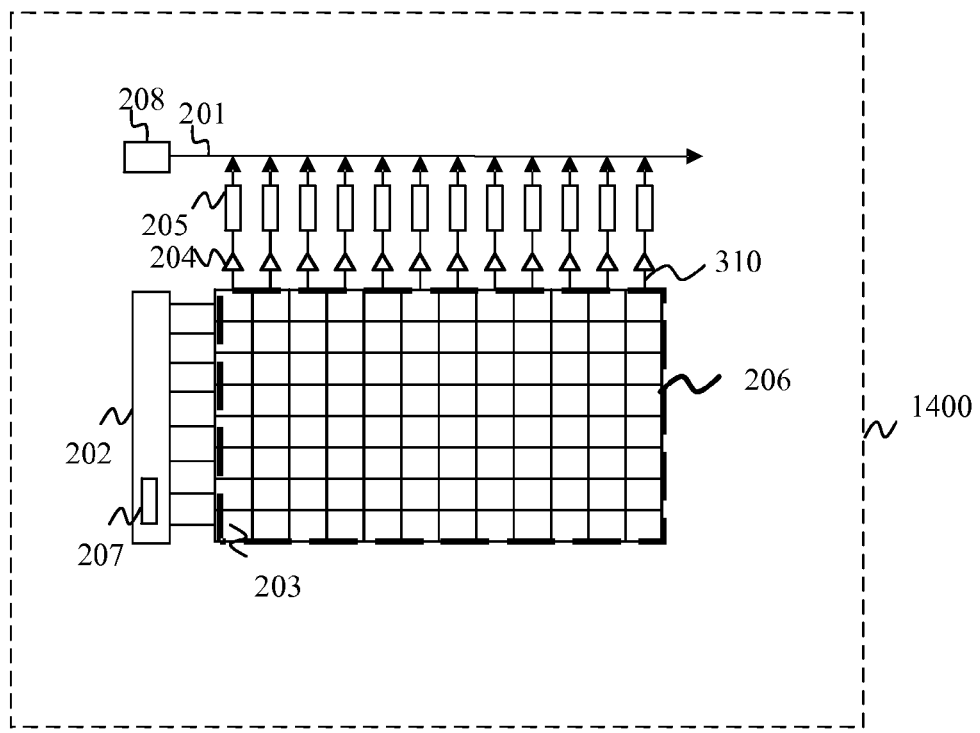
FIG. 3 is a schematic view of an image pickup element 1400 in the present invention.

FIG. 3 is a simplified configuration diagram of the image pickup element 1400. Reference numeral 203 denotes a pixel of the image pickup element 1400. As illustrate in FIG. 3, each pixel 203 is arranged in a two-dimensional matrix array in the image pickup element 1400, and a vertical array and a horizontal array in the two-dimensional matrix array are referred to as a "row" and a "column", respectively. Reference numeral 206 denotes a pixel group constituted by all rows and columns. A vertical scanning circuit 202 outputs, to a circuit of each pixel 203, a signal required for selecting a column to read a selected column and for reading a charge. Reference numeral 207 denotes a column selection control circuit which controls selecting the column.

The signal output to a vertical output line 310 is output a horizontal scanning circuit 201 via a row gain 204 and a row circuit 205, each of which is connected to its corresponding vertical output line 310. The horizontal scanning circuit 201 sequentially outputs a signal output for one column in a horizontal direction. Reference numeral 208 is a row selection control circuit which selects and outputs a row data.

Figure 4:
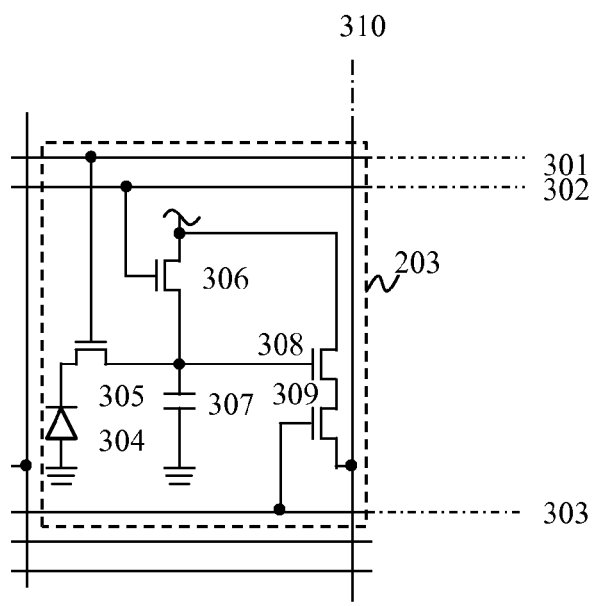
FIG. 4 is an equivalent circuit diagram of a pixel 203 in the present invention.

FIG. 4 is a diagram of illustrating the details of each pixel 203. In each pixel 203, a charge generated and accumulated by a photodiode 304 is accumulated by a floating diffusion 307 (hereinafter, referred to also as an "FD") by controlling a transmission control signal 301 to operate a transmission switch 305. A source follower amplifier 308 amplifies a voltage signal based on the charge accumulated in the FD 307 and then outputs it as a pixel signal. A column selection switch 309 is controlled by a column selection control signal 303 to connect an output of the source follower amplifier 308 to the vertical output line 310.

When an unnecessary charge accumulated in the photodiode 304 or the FD 307 is to be reset, a reset switch 306 is controlled by a reset control signal 302 and the transmission switch 305 is controlled by the transmission control signal 301 to perform the reset. The transmission control signal 301, the reset control signal 302, and the column selection control signal 303 are connected to the vertical scanning circuit 202, and each column has its corresponding signal. The CPU 50 controls the TG 1800 to output the transmission control signal 301, the reset control signal 302, and the column selection control signal 303.

Figure 5A:
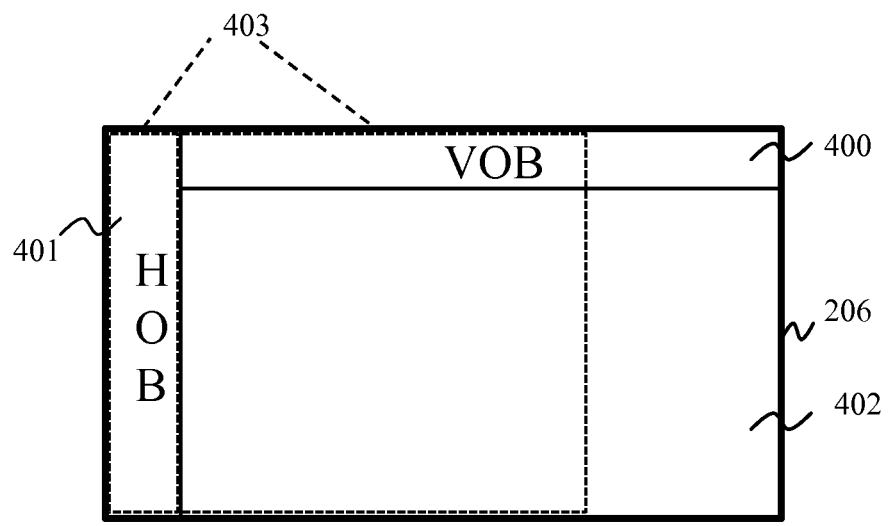
FIGS. 5A and 5B are explanatory area diagrams of a partial read-out in the present invention.
Figure 5B:
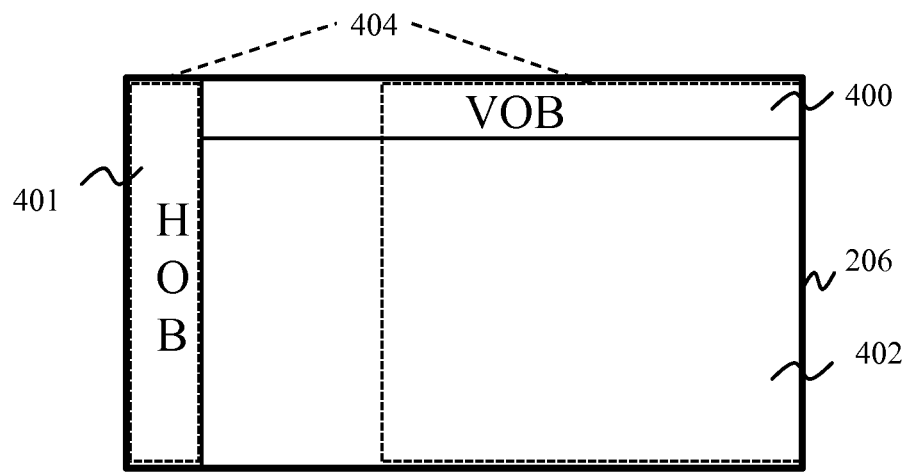

FIGS. 5A and 5B illustrate an example of a type of the pixel group 206 and a read position of the pixel group 206 during partial reading. This partial reading is controlled by the CPU 50, and in this embodiment, the CPU 50 controls a partial read position so as to be sequentially switched by vertical synchronization.

In the pixel group 206, there is an optical black area (an OB area or an OB part) which is covered by a film such as an aluminum light-shielding film so that light is not incident on the optical black area. Reference numeral 400 denotes a VOB part where its specific column is an OB part (in this embodiment, an optical black area located at the upper side of the screen). Reference numeral 401 denotes a HOB part where its specific row is an OB part (in this embodiment, an optical black area located at the left side of the screen). A portion 402 which is not the OB area is referred to as an "effective area".

A basic reading mode in reading image data from the CMOS sensor is a mode of reading data exposed on the entire screen (the entire imaging area) of the CMOS sensor. Examples of this mode include a mode of reading entire image data for a still image and a mode of reading a predetermined pixel for movie or live-view (hereinafter, referred to also as an "LV") after adding or subtracting the predetermined pixel. On the other hand, there are other reading modes as well such as a mode of cutting out and reading a part of the entire screen, e.g. an LV enlarged mode and a clop movie mode (hereinafter, referred to also as a "partial reading mode"). In an image pickup plane AF sensor whose imaging plane has a phase difference AF detection function, data for AF can be calculated by reading only a predetermined area of a part of the entire screen to be automatically focused. Therefore, in such an imaging plane AF sensor, an A image, which is one of a pair of images, is read from a part (approximately 70 percent) of the entire screen depending on an AF area occasionally by using this partial reading mode for high-speed reading. When a shading correction value for the read A image is to be acquired, the shading correction value is created based on data acquired by reading a part of the entire screen (e.g. 70 percent of the left side) and then reading other part (e.g. 70 percent of the right side). In this embodiment, a clamp correction which adjusts a dark level by a VOB part is performed when data reading is done by this partial reading mode.

In FIGS. 5A and 5B, when two-thirds of pixels of the image pickup element 1400 in a row direction is to be read, two patterns of reading, that is, reading of the left and right sides of the pixel group 206, are performed. When the left side is to be read, an area 403, which is the combination of the HOB part 401 and the left side two-thirds of the VOB part 400 and the effective area 402, is read. When the right side is to be read, an area 404, which is the combination of the HOB part 401 and the right side two-thirds of the VOB part 400 and the effective part 402, is read. Assuming that the HOB part 401 has 100 rows and the effective area 402 has 5,100 rows, a total of 3,500 rows (100+3400=3500 rows), which is the combination of the rows in the HOB part 401 and two-thirds of the rows in the VOB part 400 and the effective area 402, is output. As described above, when only a part of the pixel group 206 in the row direction (an H direction) is to be read, the CPU 50 controls the row selection control circuit 208 such that the row selection control circuit 208 performs a selection. While a description is not given in this embodiment, a row selection in a row direction (a V direction) may be performed to read only a part of the pixel group 206.

Next, an example of an operation performed in a conventional partial reading mode will be described below.

Figure 11A:
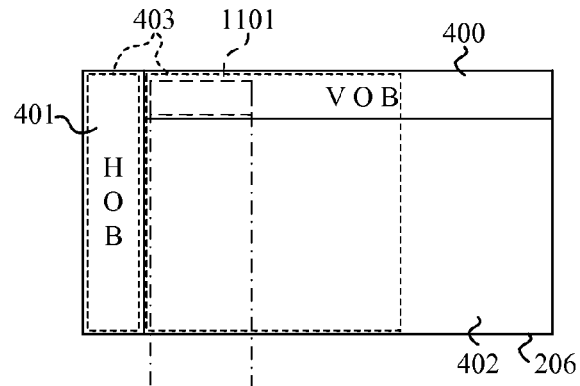
FIGS. 11A to 11E are area diagrams of a dark offset correction value acquisition in a conventional example.
Figure 11B:
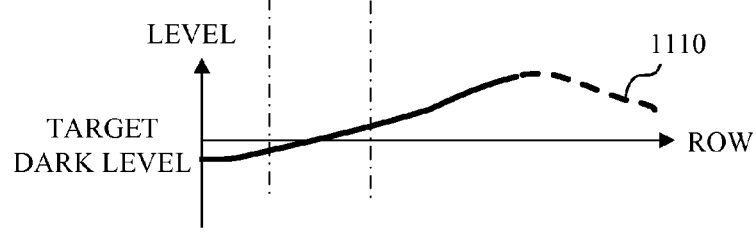
Figure 11C:
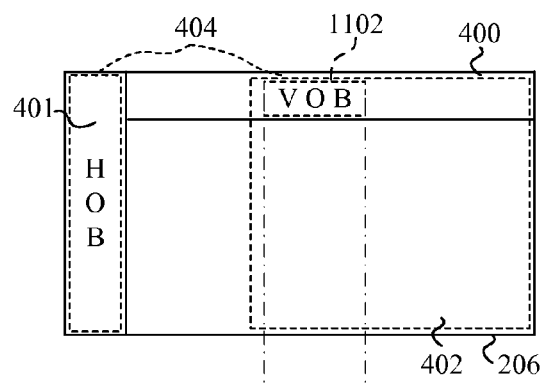
Figure 11D:
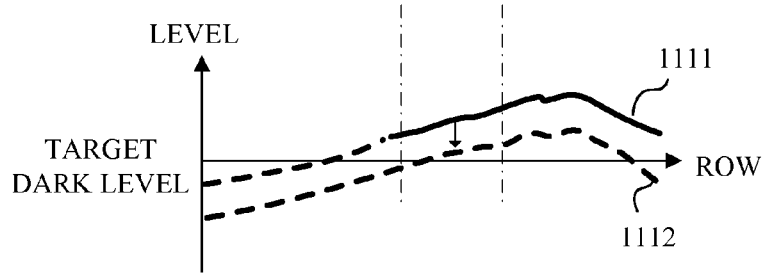
Figure 11E:
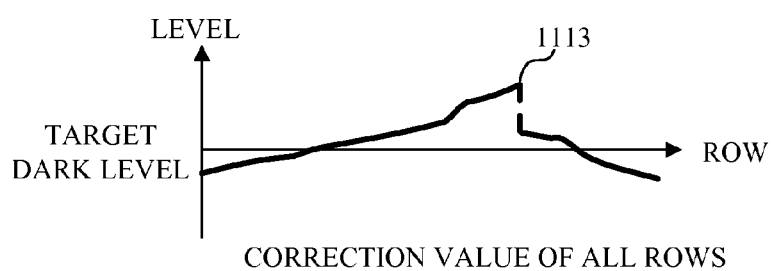

FIGS. 11A to 11E illustrate an example in which a part of the entire screen (an area equivalent to two-thirds of the entire screen) is cut out and read. FIG. 11A illustrates a state in which the area 403, which is the combination of the HOB part 401 and the left side two-thirds of the VOB part 400 and the effective area 402, is read when the pixel group 206 as the entire sensor data is constituted by the VOB part 400, the HOB part 401, and the effective area 402. FIG. 11B is a diagram of illustrating one-dimensional data (hereinafter, referred to also as "VOB dark mapping data") observed in the reading operation illustrated in FIG. 11A which is an average of each column corresponding to the number of the rows in an area for which an offset correction value is to be acquired. A horizontal axis indicates a horizontal column position and a vertical axis indicates a signal level, respectively. Reference numeral 1110 denotes data for which dark offset is not performed. In the VOB dark mapping data as illustrated in FIG. 11B, a dark offset correction value acquired in a clamp area 1101 has a value substantially equal to zero because it is almost at a target dark level. FIG. 11C illustrates a state in which the area 404, which is the combination of the HOB part 401 and the right side two-thirds of the VOB part 400 and the effective area 402, is read. FIG. 11D is VOB dark mapping data in the reading illustrated in FIG. 11C. Reference numeral 1111 denotes data for which dark offset is not performed, and reference numeral 1112 denotes data for which the dark offset has been performed. A clamp area 1102 has a level higher than a target dark level, and therefore it is corrected as indicated by the data (a dotted line) 1112.

As described above, the conventional partial reading mode reads an area used to generate a VOB offset correction value at a predetermined timing (that is, the same timing) of video reading, and therefore a VOB clamp is shifted at all times depending on an extracting position in a sensor as a whole. While cameras capable of capturing an image even in a dark area with high ISO sensitivity have been commercially available in recent years, outputting by a sensor with high ISO sensitivity may result in uneven VOB dark mapping data in the horizontal direction. The reason for this is that a large amount of gain is acquired inside the sensor with high ISO sensitivity while an offset variation component at each row is more prominent before a gain is acquired.

In the partial reading mode which cuts out a part of the entire screen, a dark offset correction value is different depending on a cut out position of the screen. Therefore, when horizontal shading correction data are to be acquired by using data extracted at each cut out position, rows with different partial reading positions inevitably have a difference in correction value as indicated by data (a solid line) 1113 in FIG. 11E. Since the screen as a whole cannot have a single correction value, each cut out position needs to have its own correction value, which requires a great deal of storage area.

Subsequently, an example of an operation performed in the partial reading mode in this embodiment will be described below.

First Embodiment

In the first embodiment, a description will be given of an example of offset correction performed at an overlapped portion when the reading by two-thirds of the portion is performed in the horizontal direction (the row direction).

FIGS. 6A to 6C are explanatory diagrams of offset correction performed when the two-thirds at the left side in the portion is read as described with reference to FIG. 5A. FIG. 6A illustrates the area 403 to be read, which is the combination of the HOB part 401 and two-thirds at the left side of the VOB part 403 and the effective area 402 of the pixel group 206, and FIG. 6B illustrates data actually read from the image pickup element 1400 and input to the AFE 1700. An offset correction value acquisition area 500 (a clamp area) illustrated in FIG. 6B is a data acquisition area which is a basis of generating a correction value to be used for the offset correction. The CPU 50 acquires an average value of data in the data acquisition area by the dark offset correction circuit 1701, and then performs a control so as to perform a subtraction between the average value and a target dark level to perform the offset correction. While the offset correction method in this embodiment is configured to acquire an average value of the entire area, a method of updating a correction value for each output of data in an area may also be adopted.

FIG. 6C illustrates VOB dark mapping data. A horizontal axis indicates a row position and a vertical axis indicates a level of an average value of the correction value acquisition area. FIGS. 6A to 6C illustrate rows such that they are located at the same position in the vertical direction. When VOB row average data to be subjected to the offset correction has a value illustrated by a dotted line 502, a part corresponding to the offset correction value acquisition area 500 is shifted from the target dark level by an amount 504 and a calculation result of the data determined by the CPU 50 is stored in the dark offset correction circuit 1701 until the partial reading is completed. Since the part is shifted to the positive side in FIG. 6B, a level is subtracted from each pixel 203 by the amount 504 when passing through the dark offset correction circuit 1701. When the offset correction circuit 1701 acquires VOB dark mapping data from the corrected data, data as indicated by a double dotted line 503 are obtained.

Figure 1A:
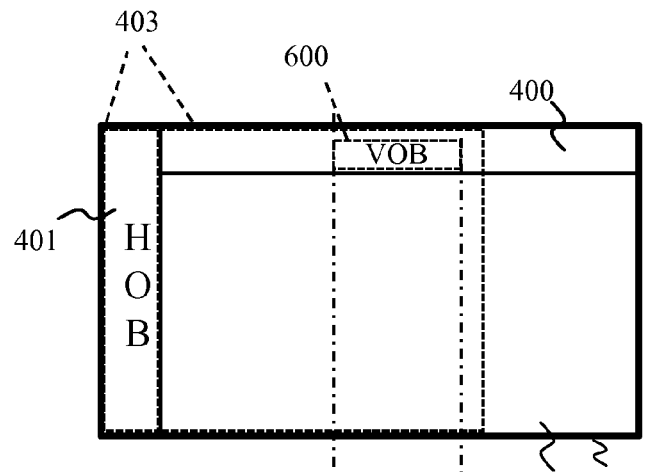
FIGS. 1A to 1D are area diagrams of a dark offset correction value acquisition in a first embodiment of the present invention.
Figure 1B:
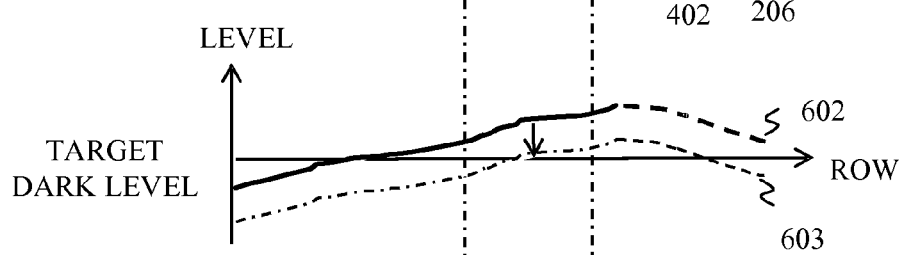
Figure 1C:
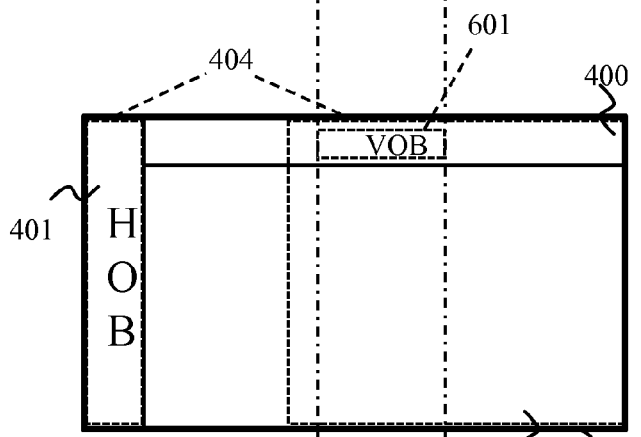
Figure 1D:
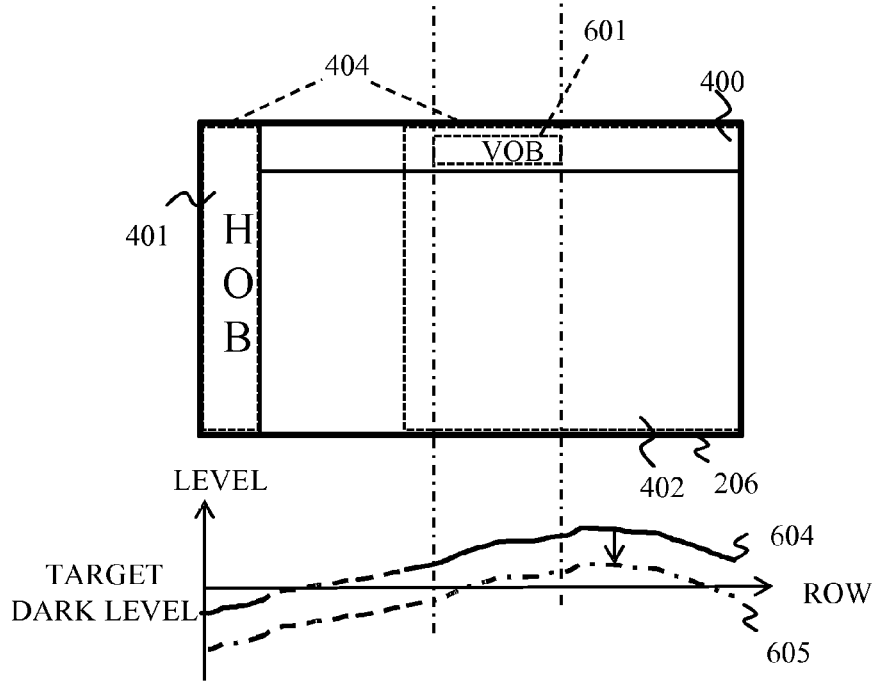

Next, referring to FIGS. 1A to 1D, a description will be given of a method of changing an offset correction value acquisition area depending on a partial reading position. FIG. 1A illustrates the read area 403 (a first selected area) used when the left side two-thirds of the entire screen is read and an offset correction value acquisition area 600 (a first correction value acquisition area). FIG. 1B illustrates VOB dark mapping data observed before and after the dark offset correction during the reading operation illustrated in FIG. 1A. A dotted line 602 denotes the data observed before the dark offset correction, and a double dotted line 603 denotes the data observed after the dark offset correction. FIG. 1C illustrates the read area 404 (a second selected area) and an offset correction value acquisition area 601 (a second correction value acquisition area) which are used when the right side two-thirds of the entire screen is read. As can be seen in FIGS. 1A and 1C, the read area 403 and the read area 404 at least partially overlap with each other (in a center area of the image pickup element 1400). FIG. 1D illustrates VOB dark mapping data observed before and after the dark offset correction during the reading operation illustrated in FIG. 1C. A solid line 604 denotes the data observed before the dark offset correction, and a double dotted line 605 denotes the data observed after the dark offset correction.

Figure 7A:
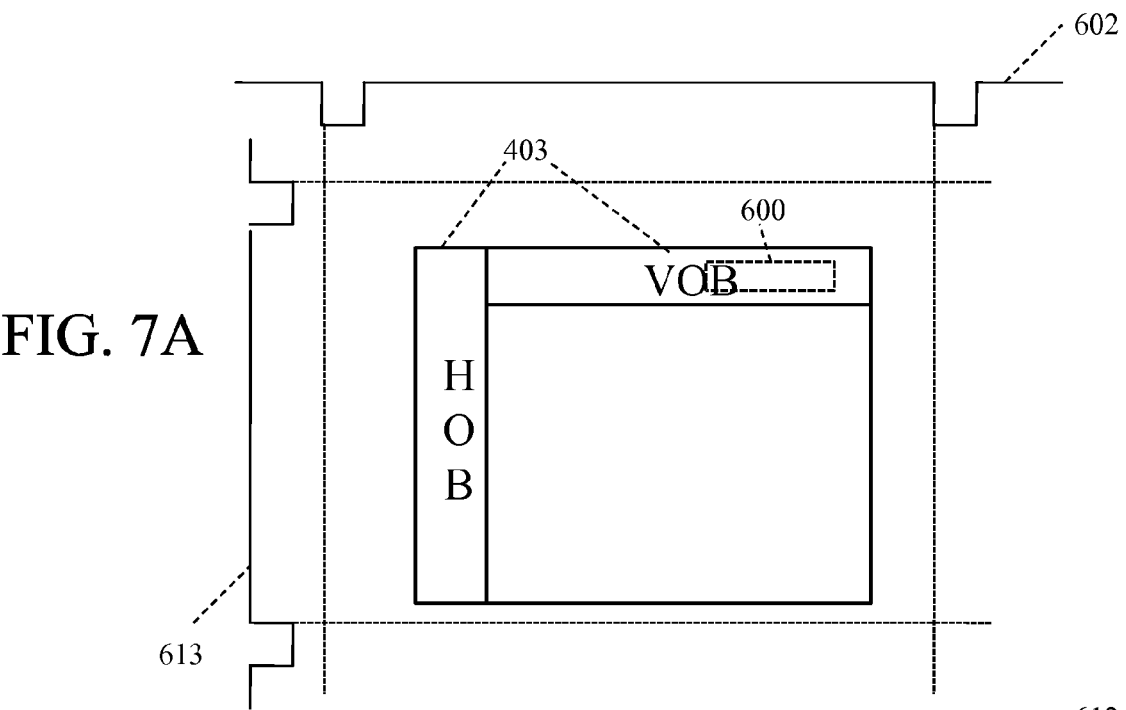
FIGS. 7A and 7B are relation diagrams of a dark offset correction value acquisition area and a synchronization signal during the partial read-out in the present invention.
Figure 7B:
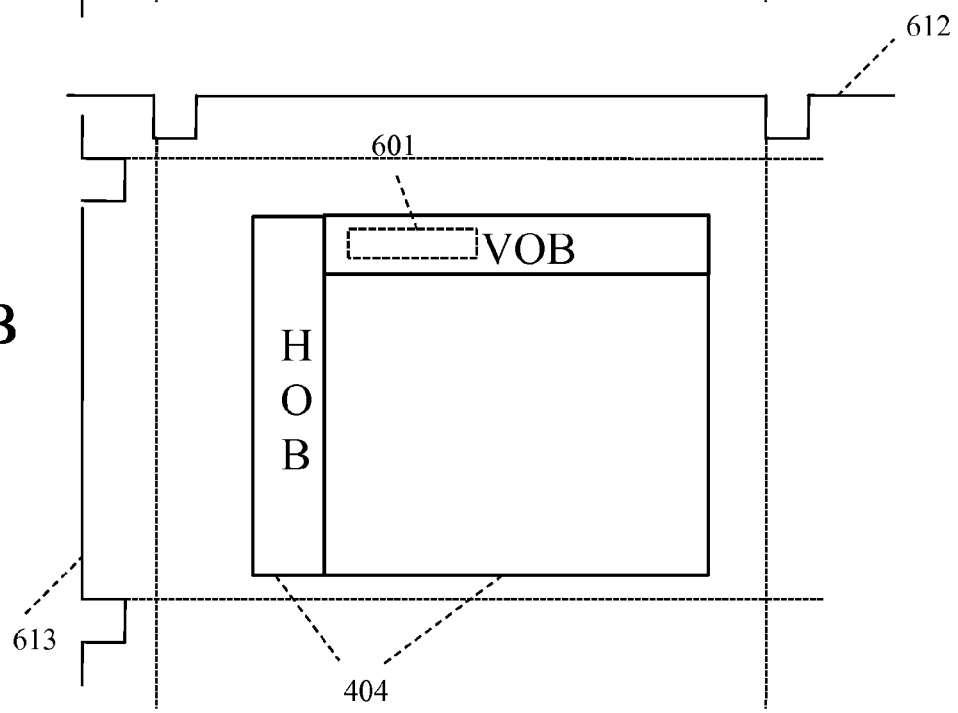

FIGS. 7A and 7B illustrate read data in the dark offset correction circuit 1701 and timing for a reference signal to designate (specify) an area. In FIG. 7A, data sent when the read part 403 of the image pickup element 1400 is read is designated such that an area 600 is to be an offset correction value acquisition area. In FIG. 7B, data sent when the read part 404 of the image pickup element 1400 is read is designated such that an area 601 is to be an offset correction value acquisition area. The CPU 50 generates a horizontal synchronization signal 612 and a vertical synchronization signal 613. The CPU 50 generates the horizontal synchronization signal 612 so as to cover a period of time for one column according to the number of pixels to be read, and a vertical synchronization signal 613 so as to cover a period of time for one image. While the offset correction value acquisition areas 600 and 601 also decide on an acquisition timing based on the horizontal synchronization signal 612 and the vertical synchronization signal 613, their acquisition timings are different from each other as can be seen in FIGS. 7A and 7B. For instance, the offset correction value acquisition area 600 is set based on a first period of time from the reference signal of the horizontal synchronization signal 612, and the offset correction value acquisition area 601 is set based on a second period of time different from (shorter than) the first period of time from the reference signal of the horizontal synchronization signal 612. However, as can be seen in FIGS. 1A to 1D, the offset correction value acquisition areas 600 and 601 are located at the same position on the sensor. In other words, in this embodiment, the offset correction value acquisition areas 600 and 601 are set at the same areas on the sensor. Accordingly, levels after the dark offset indicated by double dotted lines 603 and 605 are the same. In order to extract a part of the pixel group 206 of the sensor and then make offset-corrected data of each area match, it is necessary to determine whether or not an offset correction value acquisition area needs to overlap at a VOB part with respect to all partial readings. When there is an overlapped portion, it is possible to make each offset-corrected data match by designating an area corresponding to the overlapped portion by the offset correction circuit 1701. In this embodiment, whether or not such an overlapped portion has a size sufficient to create a correction value is also determined.

An example will be described using numerical values. For instance, in the case of an image pickup apparatus configured to generate rows of the HOB part and two-thirds of the VOB part and the effective area (100+3400=3500 rows), the number of rows of an area where the left side and the right side of extracting positions overlap is 1700. Of the 1700 rows, the same rows of remaining 1600 rows are used as offset correction acquisition area during each reading (i.e. readings of the left and right sides). All of the 1700 rows may, of course, be used.

In the case where a dark shading correction value for one screen as a whole is to be acquired in a mode which allows only partial reading, although two-thirds of image data is read when the dark offset correction method described above is used, image data for one screen is sufficient for correction value recording. As per data for the HOB part and the left side two-thirds of the VOB part and the effective area, a dark shading correction value is acquired by acquiring a dark image of the area 403 described later. This can be done by acquiring a dark image from the read area 404 for the remaining right side one-thirds of the VOB part and the effective area and then calculating a required part (the right half part of the acquired dark image) as a correction value.

Figure 8:
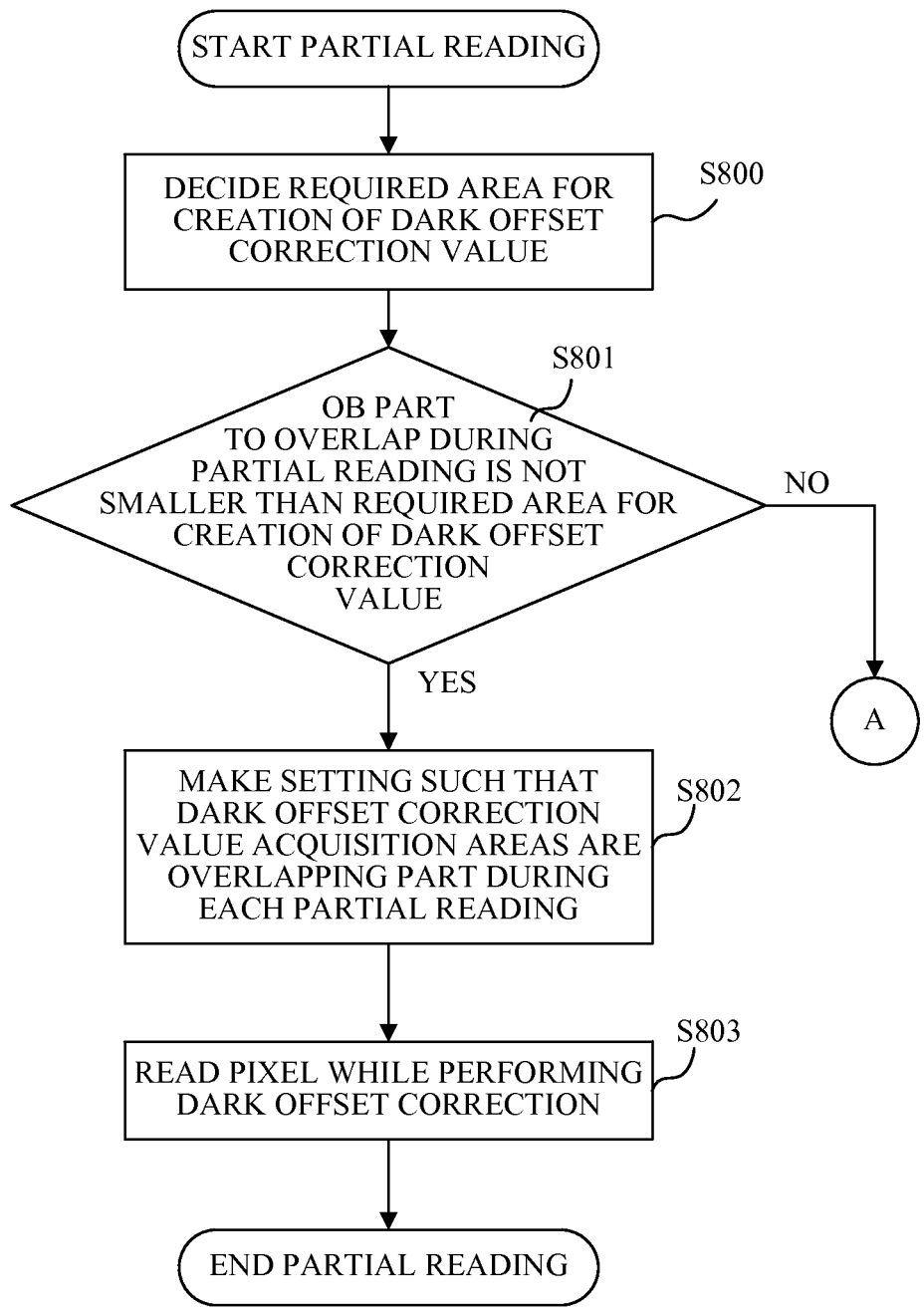
FIG. 8 is a flowchart diagram in the first embodiment of the present invention.

FIG. 8 illustrates a flowchart of the first embodiment. First, the CPU 50 determines an area required for creating a dark offset correction value (step S800). The CPU 50 determines the required area mainly taking a random noise of each pixel 203 into account. After that, the CPU 50 determines a condition as to whether or not an overlapped portion observed when only a part of the image pickup element 1400 is read is not smaller than the required area for creating a dark offset value (step S801). When the part is not smaller than the required area, the CPU 50 controls the dark offset correction circuit 1701 such that dark offset correction value acquisition areas overlap with each other during each partial reading (step S802). After the dark offset correction value acquisition areas are set, the CPU 50 performs reading while controlling the dark offset correction circuit 1701 during each partial reading such that the dark offset correction circuit 1701 performs the dark offset correction (step S803).

As described above, when it is possible to acquire an offset correction value at an overlapped portion of each read area in the partial reading mode of the image pickup element 1400, the CPU 50 designates the overlapped portion as a dark offset correction value acquisition area and then performs the reading. This makes it possible to acquire a dark offset correction value corresponding to the entire screen which is more accurate than conventional one. Moreover, since each data can be always read at the same dark offset level regardless of a read position, it is not required to store data of an overlapped portion during reading, which allows a reduction in required capacity of a memory. That is, in the mode in which a part of the entire screen is cut out, since the same offset correction operation is performed regardless of a cut out position, reading data of only one screen is sufficient when dark shading correction data are acquired.

Second Embodiment

In the second embodiment, a method of setting an offset correction value acquisition area will be described in which a difference between offset correction values is reduced as much as possible when an overlapped portion of each partially read area is smaller than a required area for creating a correction value. A description will be omitted for the same portions as those of the first embodiment.

Figure 9A:
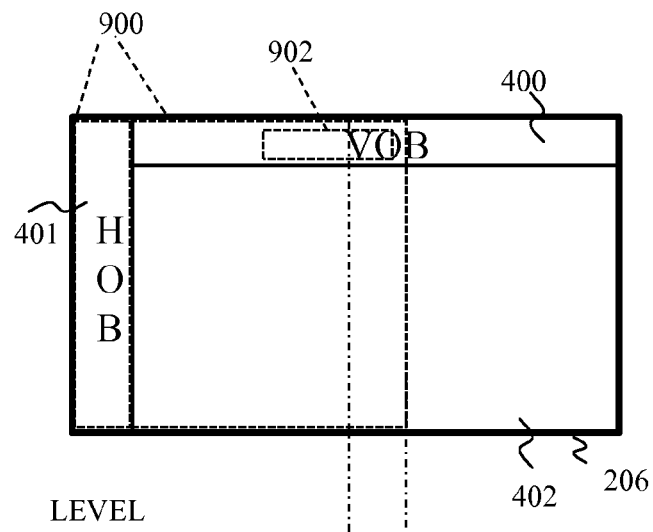
FIGS. 9A to 9D are area diagrams of a dark offset correction value acquisition in a second embodiment of the present invention.
Figure 9B:
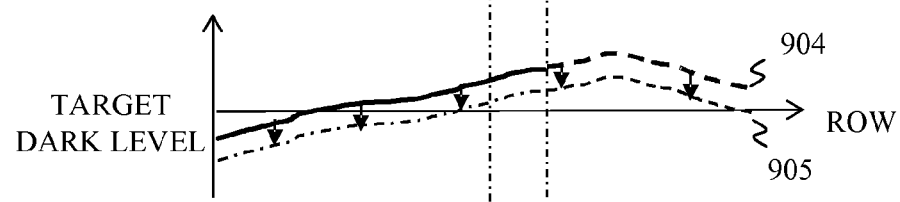
Figure 9C:
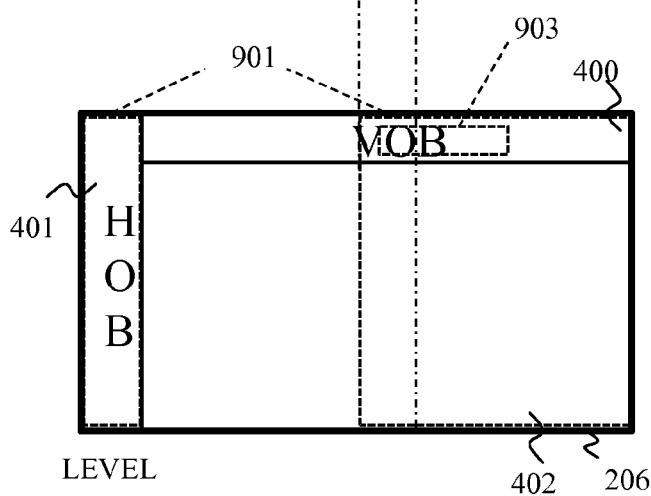
Figure 9D:
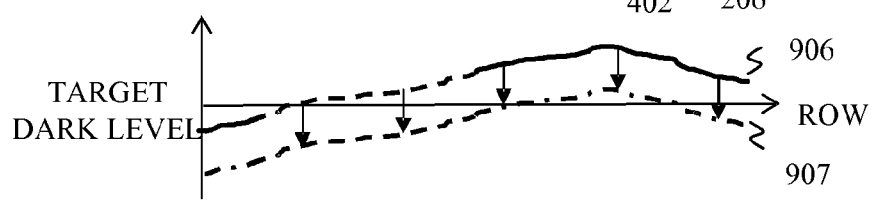

As illustrated in FIGS. 9A to 9D, a case will be described in which three-fifth of the effective area in the row direction is read. FIG. 9A illustrates a case in which the left side is read, and a portion output from the image pickup element 1400 is an area 900 (a first selected area). FIG. 9C illustrate a case in which the right side is read, and a portion output from the image pickup element 1400 is an area 901 (a second selected area). In this embodiment, an overlapped portion is smaller than that of the first embodiment and thus does not have a size covering an actually required area. Even in that case, a part close to the center of the VOB part is designated such that each offset correction value has a value as close as possible. In other words, each dark offset correction area is set such that they are located near the center part of the image pickup element 1400. In this embodiment, when the left side is to be read, an area 902 is designated as a dark offset correction value acquisition area (a first correction value acquisition area). Similarly, when the right side is to be read, an area 903 is designated as a dark offset correction value acquisition area (a second correction value acquisition area). FIG. 9B illustrate VOB dark mapping data observed before and after the dark offset correction during the reading operation illustrated in FIG. 9A. Data observed before the offset correction is indicated by a dotted line 904 and data observed after the offset correction is indicated by a double dotted line 905. FIG. 9D illustrates VOB dark mapping data observed before and after the dark offset correction during the reading operation illustrated in FIG. 9C. Data observed before the offset correction is indicated by a dotted line 906 and data observed after the offset correction is indicated by a double dotted line 907.

Compared with the data indicated by the dotted lines 904 and 906, the data indicated by the double dotted line 905 for which the offset correction is performed using data of the left side has a slightly higher value than the data indicated by the double dotted line 907 for which the offset correction is performed using data of the right side. This is because there is a difference in level at the dark offset correction value acquisition area. However, if the VOB part located on the left side relative to the area 902 is designated when the left side is to be read, an offset correction value comes close to approximately zero, leading to an increase in dark offset difference compared with the case where the right side is read. Thus, in order to make each offset correction value close, it is preferred that a dark offset correction value acquisition area is designated so as to include an overlapped portion when only a part of the entire screen is read.

Figure 10:
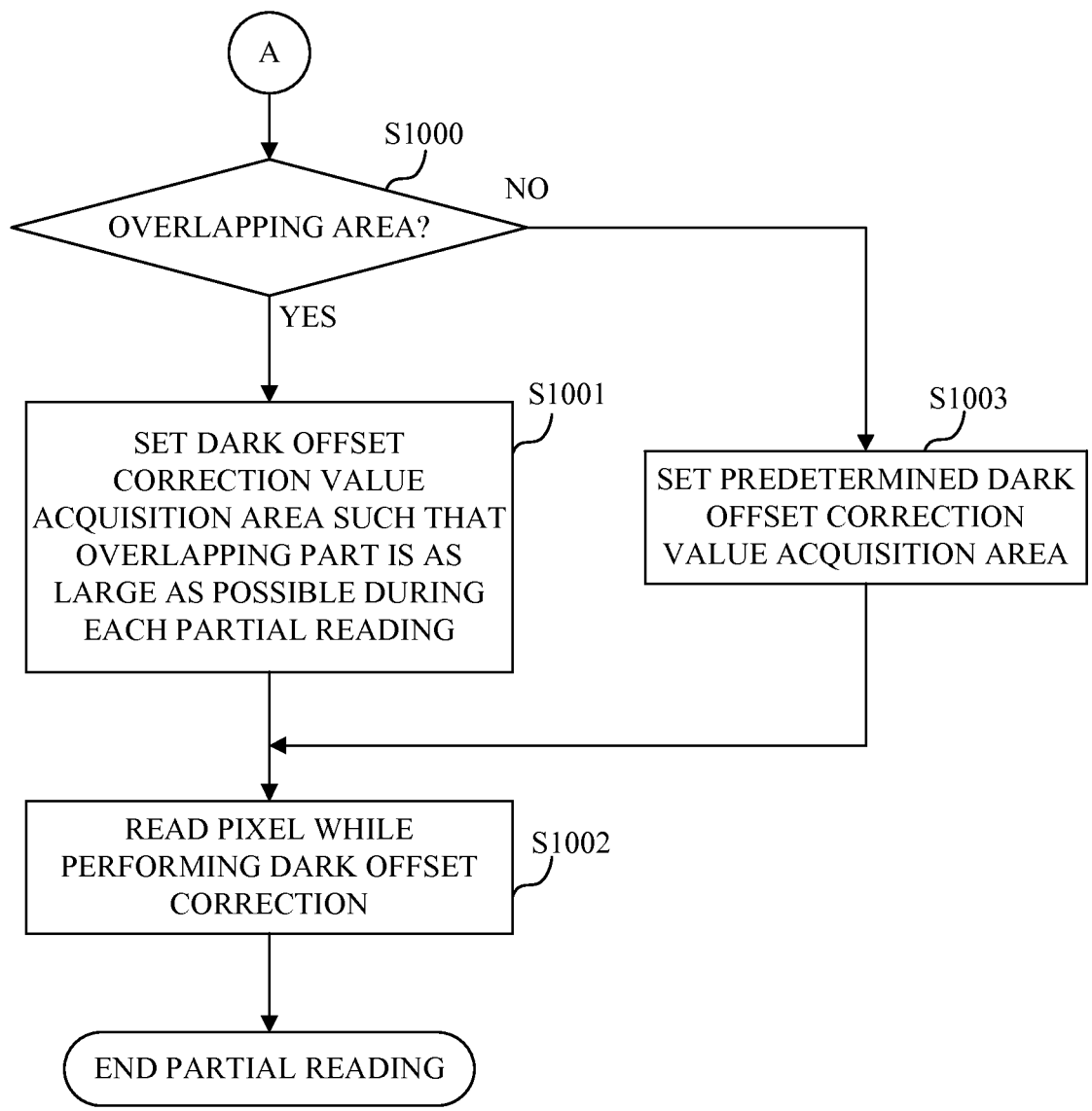
FIG. 10 is a flowchart diagram in the second embodiment of the present invention.

FIG. 10 illustrates a flowchart. In the determination of the condition at step S801, a process is started from a case in which the overlapped portion does not have a sufficient area ("No" at step S801). Even in such a case, whether or not there is an overlapped area (portion) during partial reading is determined (step S1000). When there is an overlapped portion, the CPU 50 controls the dark offset correction circuit 1701 to set a dark offset correction value acquisition area such that the overlapped portion is as large as possible during each partial reading. After the dark offset correction value acquisition area is set, the CPU 50 controls the dark offset correction circuit 1701 during each partial reading to perform reading while performing the dark offset correction (step S1002).

On the other hand, when there is not an overlapped portion in the determination of the condition at step S1000, the CPU 50 controls the dark offset correction circuit 1701 such that a predetermined dark offset correction value acquisition area is set during each partial reading (step S1003).

In the manner described above, in the partial reading mode, the CPU 50 designates a dark offset correction area so as to include the overlapped portion even when there is the overlapped portion but the overlapped portion is not sufficient. This allows a reduction in difference between dark offset levels even when read positions are different, which makes it possible to eliminate a feeling of strangeness caused when a read position is rapidly switched.

As described above, in each embodiment, the dark offset correction circuit 1701 sets the first correction value acquisition area 600 (or 902) and the second correction value acquisition area 601 (or 903) such that the first and second correction value acquisition areas are at least partially overlap with each other. This makes it possible to acquire a dark offset correction value which corresponds to the entire screen and is accurate compared to conventional one.

The present invention is suitably applicable to camera systems such as compact digital cameras, single lens reflex cameras, and video cameras.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-063299, filed on Mar. 26, 2013, which is hereby incorporated by reference herein in their entirety.

What is claimed is:

1. An image pickup apparatus comprising:
an image pickup unit having an optical black area;
a control unit configured to read a pixel from a selected area in a part of the image pickup unit; and
a dark offset correction unit configured to set a correction value acquisition area in the optical black area included in the selected area,
wherein when the control unit performs a reading from a first selected area and a reading from a second selected area which at least partially overlaps with the first selected area, the dark offset correction unit sets a first correction value acquisition area set for the optical black area included in the first selected area and a second correction value acquisition area set for the optical black area included in the second selected area such that the first correction value acquisition area and the second correction value acquisition area at least partially overlap with each other.

2. The image pickup apparatus according to claim 1, wherein the dark offset correction unit sets the first correction value acquisition area and the second correction value acquisition area in the image pickup unit so as to be equal to each other.

3. The image pickup apparatus according to claim 1, wherein the control unit is configured to switch the reading from the first selected area and the reading from the second selected area by a vertical synchronization.

4. The image pickup apparatus according to claim 1, wherein the first correction value acquisition area is set based on a first period of time from a reference signal of a synchronization signal, and the second correction value acquisition area is set based on a second period of time which is different from the first period of time from the reference signal.

5. The image pickup apparatus according to claim 4, wherein the second period of time is shorter than the first period of time.

6. The image pickup apparatus according to claim 1, wherein the dark offset correction unit is configured to perform a subtraction of a difference between an average value of data acquired from the correction value acquisition area and a target dark level to perform a dark offset correction.

7. An image pickup system comprising:
an image pickup apparatus; and
an image pickup lens removably mounted on the image pickup apparatus,
wherein the image pickup apparatus comprises:
an image pickup unit having an optical black area;
a control unit configured to read a pixel from a selected area in a part of the image pickup unit; and
a dark offset correction unit configured to set a correction value acquisition area in the optical black area included in the selected area,
wherein when the control unit performs a reading from a first selected area and a reading from a second selected area which at least partially overlaps with the first selected area, the dark offset correction unit sets a first correction value acquisition area set for the optical black area included in the first selected area and a second correction value acquisition area set for the optical black area included in the second selected area such that the first correction value acquisition area and the second correction value acquisition area at least partially overlap with each other.

8. A method of controlling an image pickup apparatus including an image pickup unit having an optical black area, a control unit configured to read a pixel from a selected area in a part of the image pickup unit, and a dark offset correction unit configured to set a correction value acquisition area in the optical black area included in the selected areas, the method comprising the steps of:
performing a reading from a first selected area of the image pickup unit;
performing a reading from a second selected area of the image pickup unit, the second selected area at least partially overlapping with the first selected area; and
setting a first correction value acquisition area and a second correction value acquisition area such that the first correction value acquisition area set for the optical black area included in the first selected area and the second correction value acquisition area set for the optical black area included in the second selected area at least partially overlap with each other.

9. A non-transitory computer-readable storage medium storing a program which causes a computer to execute a process comprising the steps of:
performing a reading from a first selected area of an image pickup unit;
performing a reading from a second selected area of the image pickup unit, the second selected area at least partially overlapping with the first selected area; and
setting a first correction value acquisition area and a second correction value acquisition area such that the first correction value acquisition area set for an optical black area included in the first selected area and the second correction value acquisition area set for the optical black area included in the second selected area at least partially overlap with each other.

* * * * *